(12) United States Patent
Levitsky et al.

(10) Patent No.: US 11,265,881 B2
(45) Date of Patent: Mar. 1, 2022

(54) IMPLICIT RADIO LINK MONITORING RESOURCE CONFIGURATION

(71) Applicant: QUALCOMM Incorporated, San Diego, CA (US)

(72) Inventors: Michael Levitsky, Rehovot (IL); Parisa Cheraghi, San Diego, CA (US); Hung Dinh Ly, San Diego, CA (US); Heechoon Lee, San Diego, CA (US); Igor Gutman, Ramat Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 16/668,217

(22) Filed: Oct. 30, 2019

(65) Prior Publication Data

US 2020/0145983 A1    May 7, 2020

Related U.S. Application Data

(60) Provisional application No. 62/755,210, filed on Nov. 2, 2018.

(51) Int. Cl.
| | |
|---|---|
| *H04W 72/04* | (2009.01) |
| *H04W 56/00* | (2009.01) |
| *H04L 5/00* | (2006.01) |

(52) U.S. Cl.
CPC ......... *H04W 72/048* (2013.01); *H04L 5/0051* (2013.01); *H04W 56/001* (2013.01); *H04W 72/046* (2013.01)

(58) Field of Classification Search
CPC ...... H04B 7/0695; H04L 5/0048–0057; H04L 5/0094; H04L 5/0098; H04W 56/001; H04W 72/042
See application file for complete search history.

(56) References Cited

U.S. PATENT DOCUMENTS

| | | | |
|---|---|---|---|
| 2019/0058519 A1* | 2/2019 | Davydov | H04L 5/0053 |
| 2019/0320333 A1* | 10/2019 | Koskela | H04L 5/0048 |

FOREIGN PATENT DOCUMENTS

EP    3553969 A1    10/2019

OTHER PUBLICATIONS

Intel Corporation: "Remaining Issues on Beam Management", 3GPP Draft; R1-1808669 Remaining Issues on BM, $3^{rd}$ Generation Partnership Project (3GPP), Mobile Competence Centre; 650, Route Des Lucioles; F-06921 Sophia-Amtpolis Cedex; France, vol. RAN WG1, No. Gothenburg, Sweden; Aug. 20, 2018-Aug. 24, 2018,| Aug. 11, 2018 (Aug. 11, 2018), XP051516045, Retrieved from the Internet: URL:http://www.3gpp.org/ftp/tsg%5Fran/WG1%5FRL1/TSGR1%5F94/Docs/R1%2D1808669%2EZip [retrieved on Aug. 11, 2018] pp. 7,8,10-p. 11.

(Continued)

*Primary Examiner* — Pao Sinkantarakorn
(74) *Attorney, Agent, or Firm* — Patterson & Sheridan, LLP

(57) ABSTRACT

Techniques for implicitly configuring resources for radio link monitoring or beam failure detection. An example method generally includes identifying that RLM resources or BFD resources are configured implicitly by at least in part: obtaining TCI states, for PDDCH CORESETs, obtaining an indication that at least one of the TCI states is activated to become an active TCI state of the PDCCH CORESETs, identifying one or more CSI-RS resources configured in the at least one of active TCI states of the PDCCH CORESETs, and if the UE does not support RLM or BFD based on the CSI-RS or the one or more CSI-RS resources are AP or SP, determining a SS block for RLM or BFD that has a QCL relationship with the one or more CSI-RS resources of the at least one of active TCI states; and performing RLM or BFD based on the SS block.

20 Claims, 11 Drawing Sheets

(56) References Cited

OTHER PUBLICATIONS

International Search Report and Written Opinion—PCT/US2019/059093—ISA/EPO—dated Jan. 28, 2020.
NTT Docomo et al: "Maintenance for NR mobility precedure", 3GPP Draft; R1-1809136 Maintenance for NR Mobility Procedure Final. 3rd Generation Partnership Project (3GPP), Mobile Competence Centre: 650, Route Des Lucioles; F-06921 Sophia-Antipolis Cedex; FRA, vol. RAN WG1, No. Gothenburg, Sweden; Aug. 20, 2018-Aug. 24, 2018, Aug. 11, 2018 (Aug. 11, 2018), XP051516506, Retrieved from the Internet: URL: http://www.3gpp.org/ftp/tsg%5Fran/wG1%5FRL1/TSGR1%5F94/Docs/R1%2D1809136%2Ezip [retrieved on Aug. 11, 2018] p. 5.

* cited by examiner

800

802

Identify that radio link monitoring (RLM) resources or beam failure detection (BFD) resources are configured implicitly by at least in part: obtaining transmission configuration indicator (TCI) states, for physical downlink control channel (PDCCH) control resource sets (CORESETs), obtaining an indication that at least one of the TCI states is activated to become an active TCI state of the PDCCH CORESETs, identifying one or more channel state information reference signal (CSI-RS) resources configured in the at least one of active TCI states of the PDCCH CORESETs, and if the UE does not support RLM or BFD based on the CSI-RS or the one or more CSI-RS resources are aperiodic or semi-persistent, determining a synchronization signal (SS) block for RLM or BFD that has a quasi-co-location (QCL) relationship with the one or more CSI-RS resources of the at least one of active TCI states

804

Perform RLM or BFD based on the SS block (taking into account a gain parameter)

FIG. 8

IMPLICIT RADIO LINK MONITORING RESOURCE CONFIGURATION

CROSS-REFERENCE TO RELATED APPLICATION(S)

The present application for patent claims priority to U.S. Provisional Application No. 62/755,210, filed Nov. 2, 2018, which is assigned to the assignee of the present application and hereby expressly incorporated by reference herein in its entirety.

BACKGROUND

Field of the Disclosure

Aspects of the present disclosure relate to wireless communications, and more particularly, to techniques for implicitly configuring resources for radio link monitoring (RLM) or beam failure detection (BFD).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between base stations and user equipment in a wireless network.

Certain aspects provide a method of wireless communication by a user equipment. The method generally includes identifying that radio link monitoring (RLM) resources or beam failure detection (BFD) resources are configured implicitly by at least in part: obtaining transmission configuration indicator (TCI) states, for physical downlink control channel (PDCCH) control resource sets (CORESETs), obtaining an indication that at least one of the TCI states is activated to become an active TCI state of the PDCCH CORESETs, identifying one or more channel state information reference signal (CSI-RS) resources configured in the at least one of active TCI states of the PDCCH CORESETs, and if the UE does not support RLM or BFD based on the CSI-RS or the one or more CSI-RS resources are aperiodic or semi-persistent, determining a synchronization signal (SS) block for RLM or BFD that has a quasi-co-location (QCL) relationship with the one or more CSI-RS resources of the at least one of active TCI states; and performing RLM or BFD based on the SS block.

Certain aspects provide a method of wireless communication by a base station. The method generally includes determining to implicitly configure radio link monitoring (RLM) resources or beam failure detection (BFD) resources; configuring a user equipment (UE) with transmission configuration indicator (TCI) states for physical downlink control channel (PDCCH) control resource sets (CORESETs); signaling, to the UE, to activate at least one of the TCI states including one or more channel state information reference signal (CSI-RS) resources having a quasi-co-location (QCL) relationship with an synchronization signal (SS) block, to be used as an implicit configuration of the RLM resources or the BFD resources; and receiving an indication of a radio link failure from the UE.

Certain aspects provide an apparatus for wireless communication. The apparatus generally includes a receiver configured to receive transmission configuration indicator (TCI) states, for physical downlink control channel (PDCCH) control resource sets (CORESETs), and receive an indication that at least one of the TCI states is activated to become an active TCI state of the PDCCH CORESETs. The apparatus also includes a processing system configured to identify that radio link monitoring (RLM) resources or beam failure detection (BFD) resources are configured implicitly by at least in part: identifying one or more channel state information reference signal (CSI-RS) resources configured in the at least one of active TCI states of the PDCCH CORESETs, and if the apparatus does not support RLM or BFD based on the CSI-RS or the one or more CSI-RS resources are aperiodic or semi-persistent, determining a synchronization signal (SS) block for RLM or BFD that has a quasi-co-location (QCL) relationship with the one or more CSI-RS resources of the at least one of active TCI states. The processing system is further configured to perform RLM or BFD based on the SS block.

Certain aspects provide an apparatus for wireless communication. The apparatus generally includes a processing system configured to determine to implicitly configure radio link monitoring (RLM) resources or beam failure detection (BFD) resources. The apparatus also includes a transmitter configured to: transmit, to a user equipment (UE), transmission configuration indicator (TCI) states for physical downlink control channel (PDCCH) control resource sets (CORESETs), and transmit, to the UE, to activate at least one of the TCI states including one or more channel state information reference signal (CSI-RS) resources having a quasi-co-location (QCL) relationship with an synchronization signal (SS) block, to be used as an implicit configuration of the RLM resources or the BFD resources. The apparatus further includes a receiver configured to receive an indication of a radio link failure from the UE.

Aspects of the present disclosure also provide various apparatuses, means, and computer program products corresponding to the methods and operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 8 is a flow diagram illustrating example operations performed by a UE for performing RLM/BFD using implicitly configured RLM/BFD resources, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
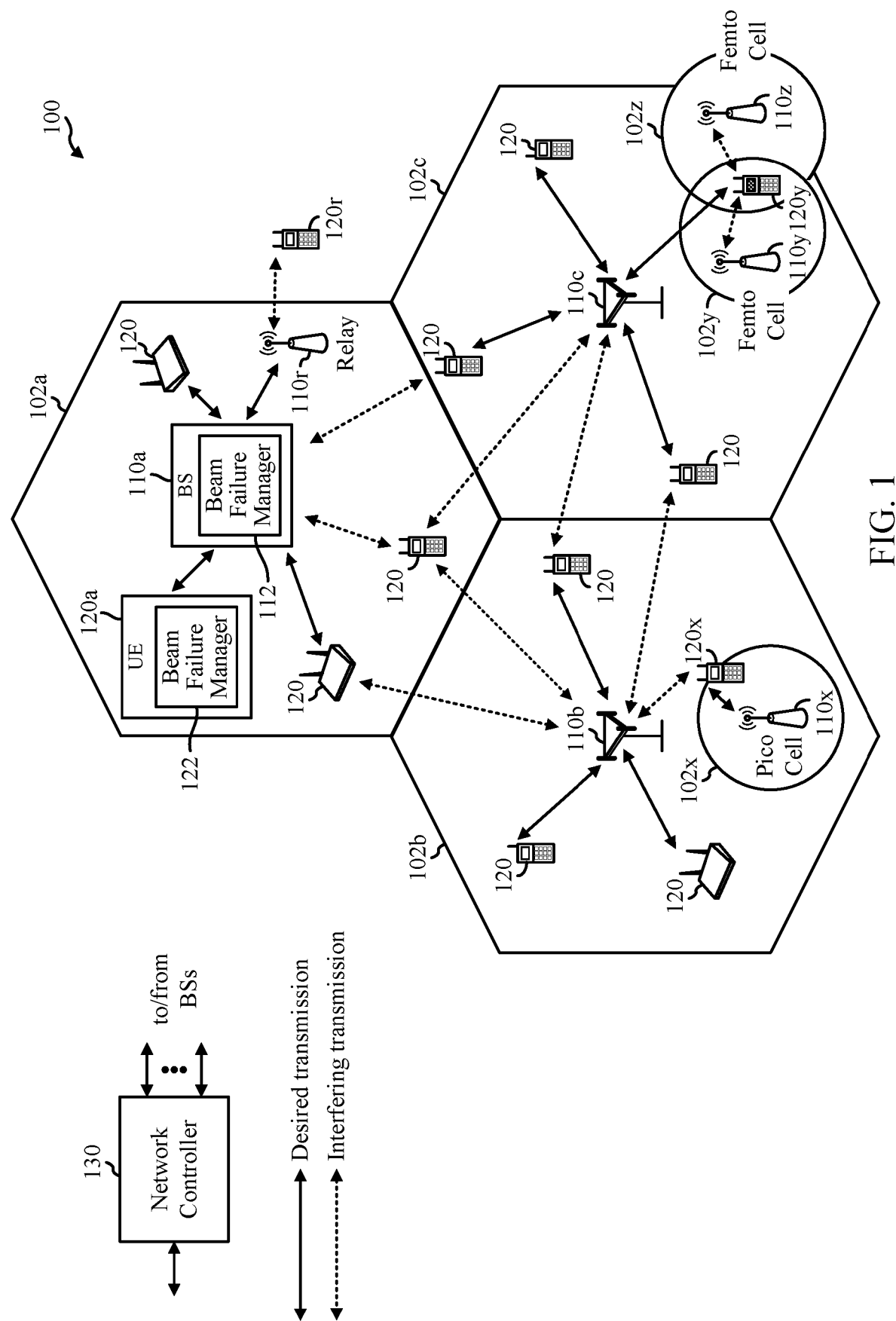
FIG. 1 is a block diagram conceptually illustrating an example telecommunications system, in accordance with certain aspects of the present disclosure.

Aspects of the present disclosure provide apparatus, methods, processing systems, and computer readable mediums for implicitly configuring resources for radio link monitoring (RLM) or beam failure detection (BFD). In certain wireless communication systems (e.g., 5G NR), the network may signal to a UE an explicit configuration for RLM/BFD resources. For instance, the UE may be explicitly configured with a RLM-RS/BFD reference signal via control signaling such as radio resource control (RRC) messages. An RRC reconfiguration may be relatively slow, non-synchronous, and consume more radio resources compared to other signaling techniques (e.g., downlink control information (DCI) or a MAC-control element (MAC-CE)). An implicit RLM/BFD configuration may enable the UE and the network to dynamically follow the corresponding beams subset/resources addressed for RLM/BFD without a implementing an RRC reconfiguration of RLM/BFD resources. For example, the UE may assume that the RLM/BFD resources follow PDCCH beam switching with regard to a quasi-co-located source resource as further described herein.

The present disclosure provides implicit RLM/BFD resource configurations where RLM/BFD resources are determined based on CSI-RS resources used/configured in the active TCI states of PDCCH control resource sets (CORESETs) as further described herein. The implicit configuration may provide an ability to dynamically follow beam switching dynamics for RLM/BFD beams subset in terms of the corresponding RLM/BFD resources without an explicit RLM/BFD configuration, such as an RRC reconfiguration. The implicit configurations described herein may enable various performance improvements including improved RLM/BFD that dynamically track beam switches, reduced latency due to improved RLM/BFD, enhanced bandwidth due to improved RLM/BFD, and reduced signaling overhead without additional RRC signaling to reconfigure RLM/BFD resources.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. The wireless communication network 100 may be a New Radio (NR) or 5G network that uses an implicit configuration for RLM or BFD. As shown, the BS 110a includes a beam failure manager 112 that determines to implicitly configure a UE with RLM/BFD resources and activates TCI states on a UE to implicitly indicate the RLM/BFD resources, in accordance with aspects of the present disclosure. The UE 120a include a beam failure manager 122 that identifies RLM/BFD resources based on a TCI state associated with an SS block and performs RLM/BFD processes based on monitoring of the SS block, in accordance with aspects of the present disclosure.

As illustrated in FIG. 1, the wireless network 100 may include a number of base stations (BSs) 110 and other network entities. A BS may be a station that communicates with user equipment (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells.

In some examples, access to the air interface may be scheduled, wherein a scheduling entity (e.g., abase station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
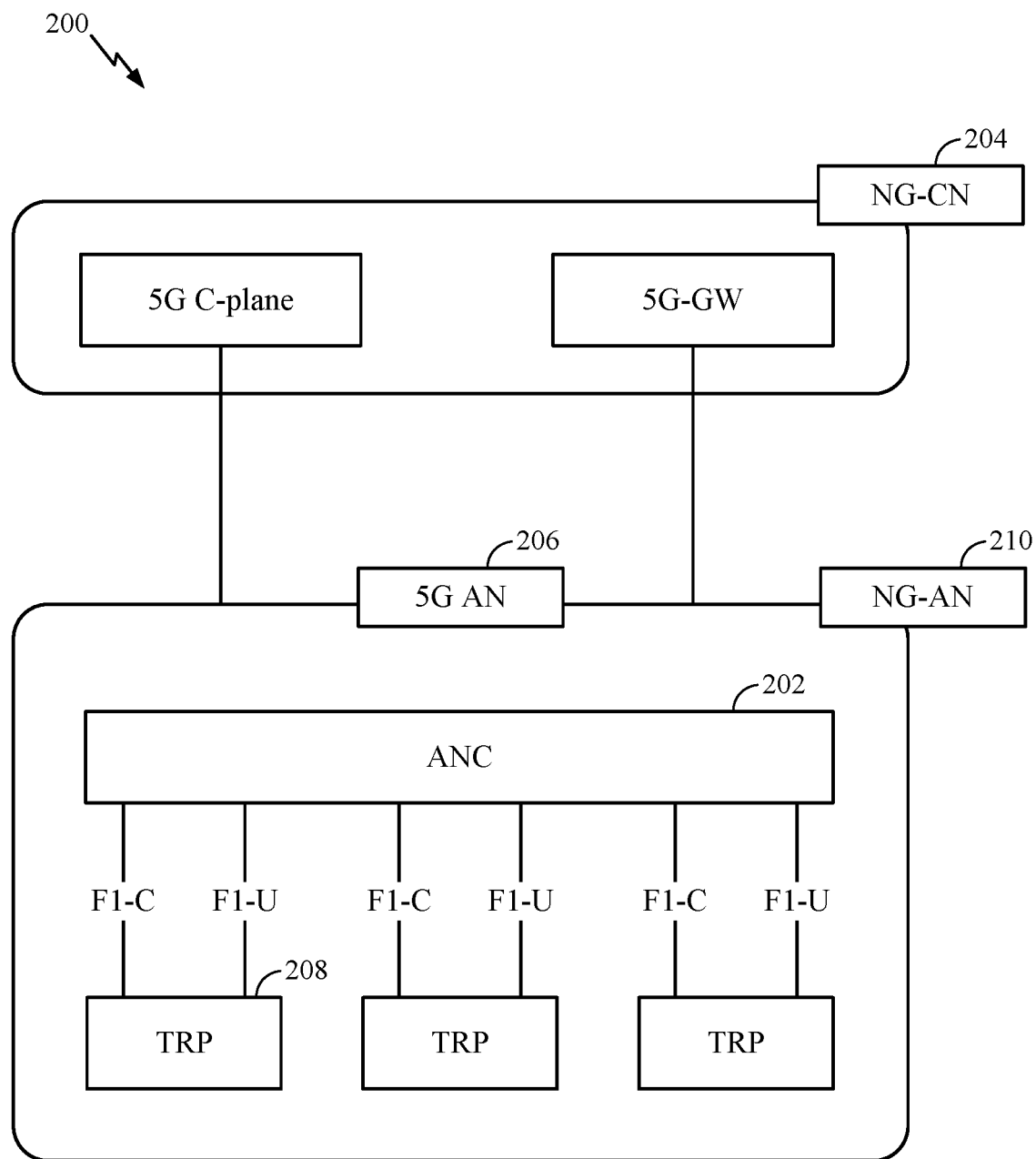
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
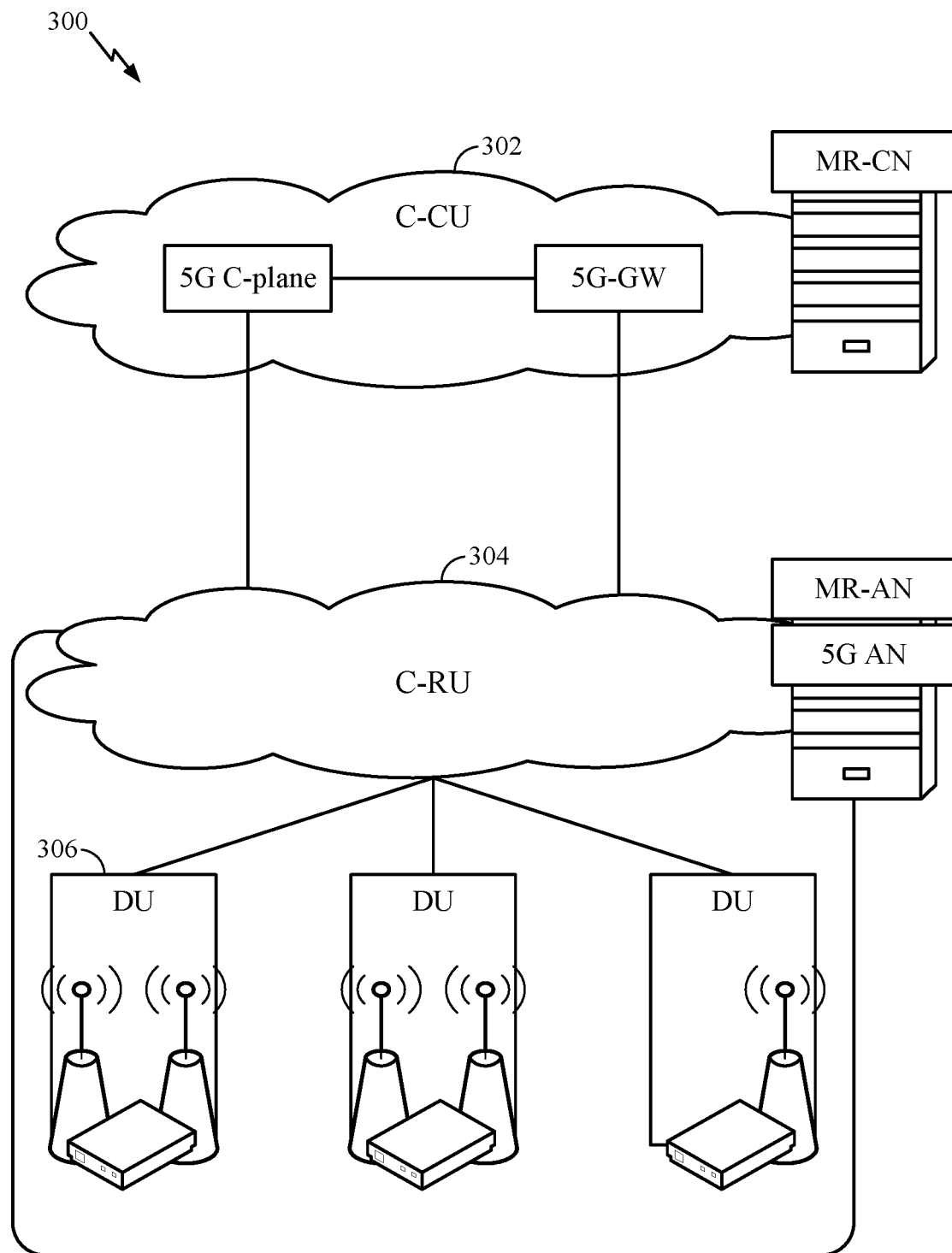
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
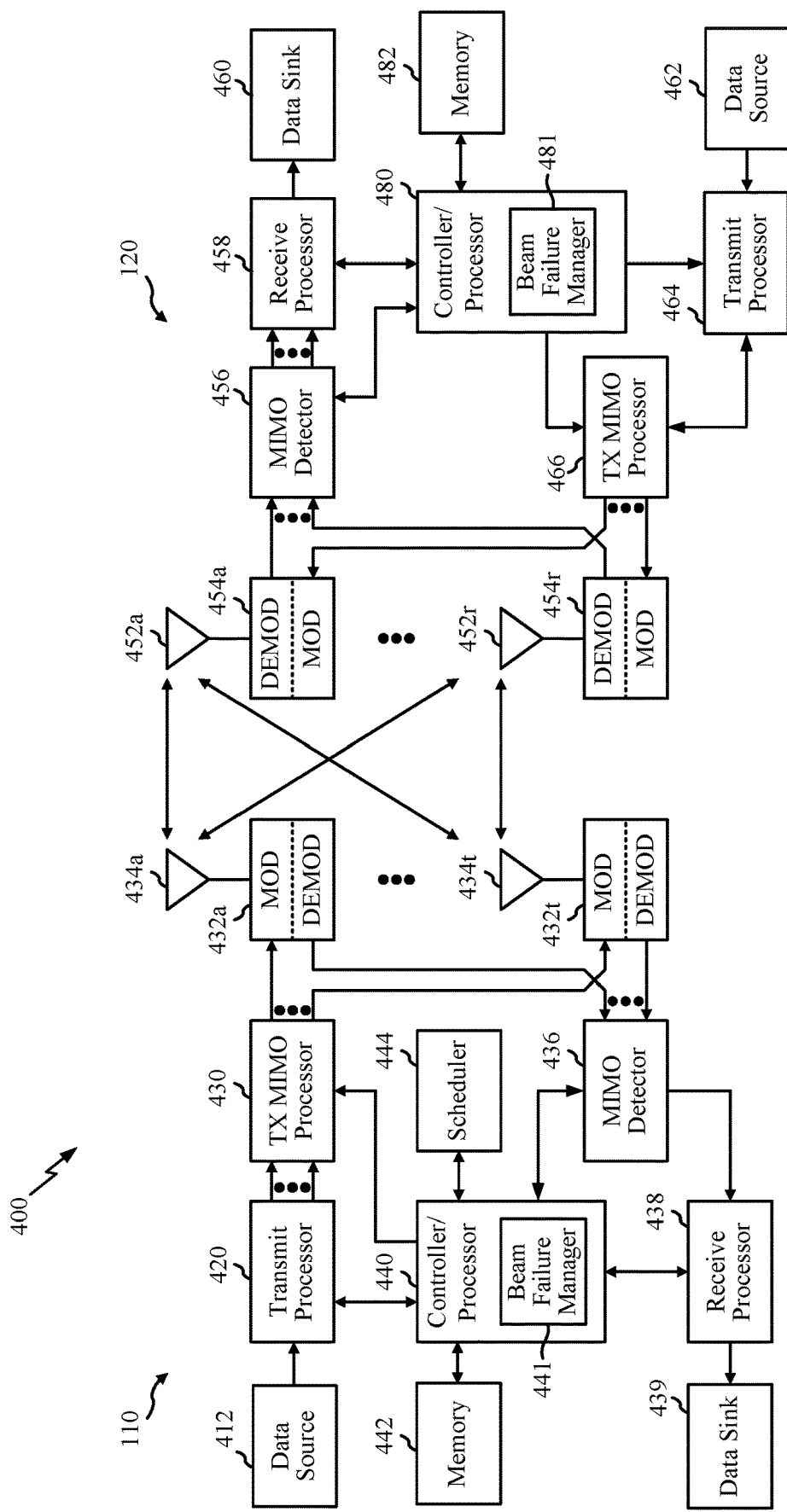
FIG. 4 is a block diagram conceptually illustrating a design of an example base station (BS) and user equipment (UE), in accordance with certain aspects of the present disclosure.
Figure 9:
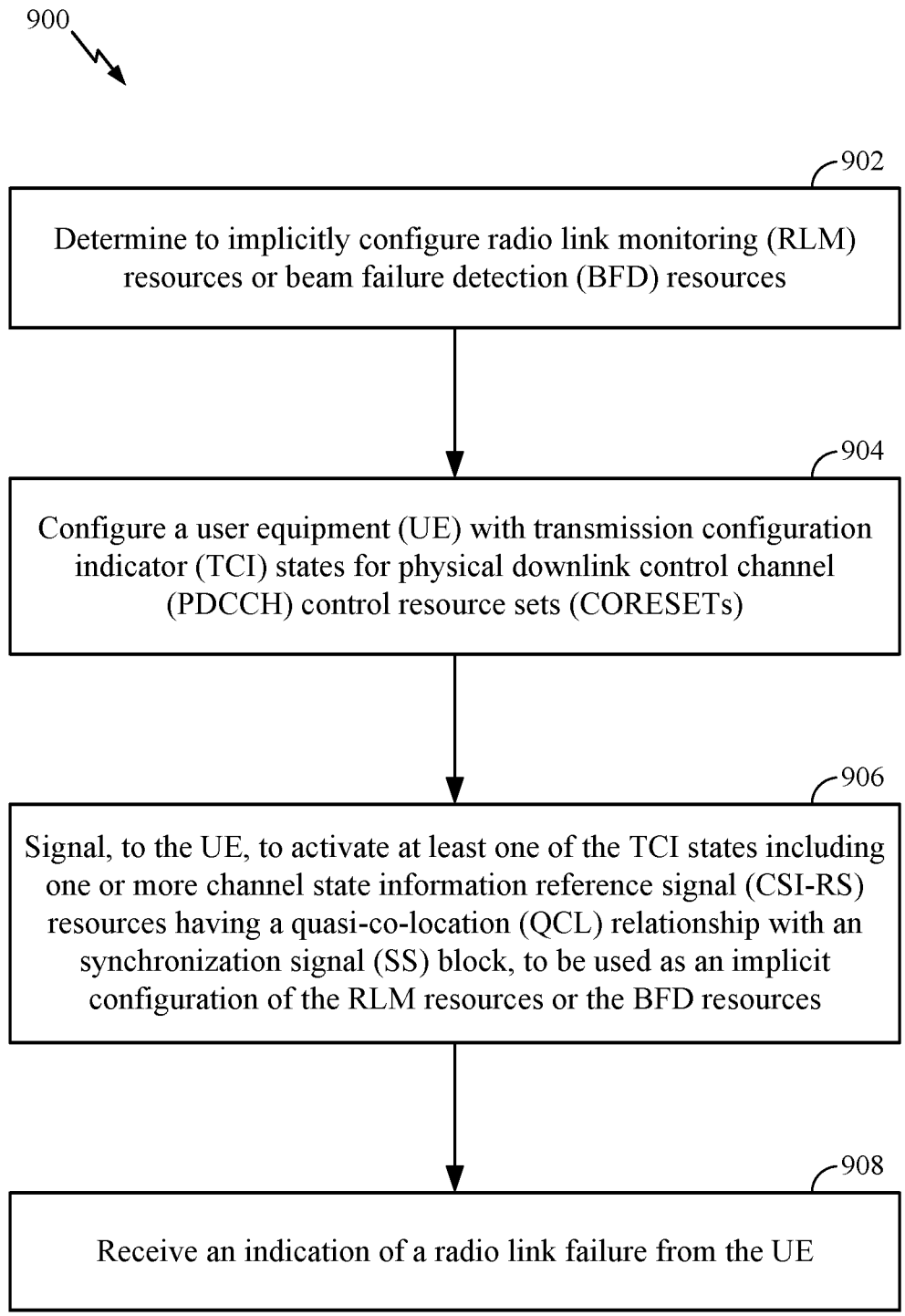
FIG. 9 is a flow diagram illustrating example operations performed by BS for implicitly signaling RLM/BFD resources, in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein as illustrated in FIGS. 8 and 9.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

As shown, the controller/processor 240 of the BS 110 has a beam failure manager 241 that determines to implicitly configure a UE with RLM/BFD resources and activates TCI states on a UE to implicitly indicate the RLM/BFD resources, in accordance with aspects of the present disclosure. The controller/processor 480 of the UE 120 has a beam failure manager 481 that identifies RLM/BFD resources based on a TCI state associated with an SS block and performs RLM/BFD processes based on monitoring of the SS block, in accordance with aspects of the present disclosure.

Figure 5:
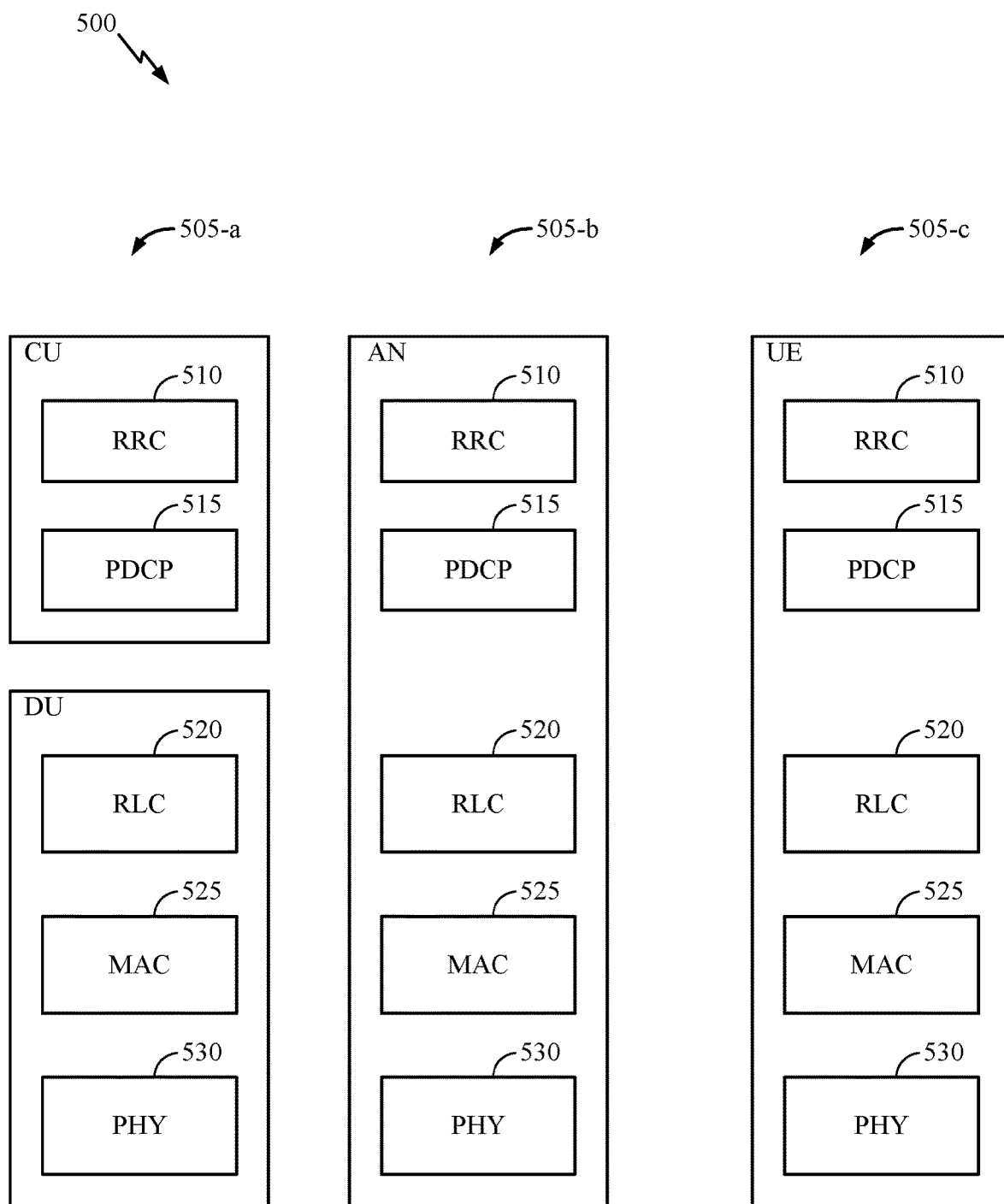
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
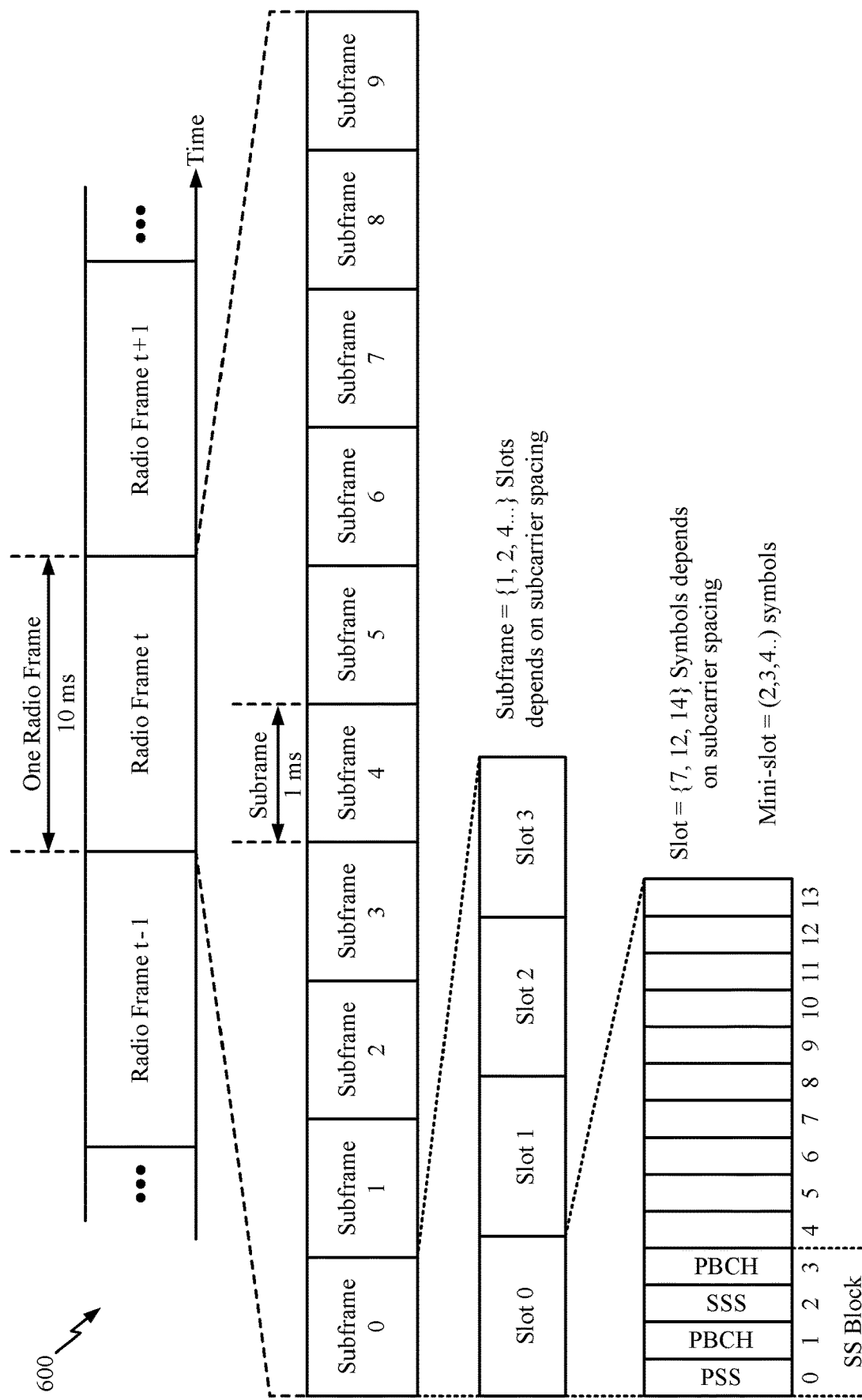
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7, 12, or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example RIM/BFD Resource Configuration

In certain wireless communication systems (e.g., 5G NR), the downlink radio link quality of a cell is monitored by a UE for the purpose of indicating out-of-sync/in-sync status to higher network layers (e.g., higher protocol stack layers on the UE 120, BS 110, or Network Controller 130). The UE may measure an RLM reference signal (RLM-RS) to assess radio link quality. A similar procedure referred to as beam failure detection (BFD) may be used for candidate beams. In certain cases, the PDCCH quality monitoring may be addressed via various BFD procedures. For instance, BFD assumes PDCCH quality monitoring on beams that may not be the current serving beam of a UE. An out-of-sync status on all of the RLM and BFD resources may trigger the UE to signal a radio link failure (RLF) to higher network layers (e.g., BS 110 or Network Controller 130 illustrated in FIG. 1).

The network may signal to the UE an explicit or implicit configuration for the RLM-RS/BFD-RS resources. For instance, the UE may be explicitly configured with the RLM-RS/BFD-RS via control signaling such as radio resource control (RRC) messages. An RRC reconfiguration may be relatively slow, non-synchronous, and consume more radio resources compared to other signaling techniques (e.g., downlink control information (DCI) or a MAC-control element (MAC-CE)). An implicit RLM/BFD configuration may enable the UE and the network to dynamically follow the corresponding beams subset/resources addressed for RLM/BFD without a implementing an RRC reconfiguration of RLM/BFD resources. For example, the UE may assume that the RLM/BFD resources follow PDCCH beam switching with regard to a quasi-co-located source resource as further described herein.

In certain aspects, a valid resource for RLM/BFD measurements may be considered a periodic reference signal, and the UE may not expect to use an aperiodic or semi-persistent reference signal for RLM/BFD. In cases where aperiodic or semi-persistent resources are signaled to the UE, the UE may assume the RLM/BFD resources correspond to a quasi-co-located source of the aperiodic or semi-persistent resources as further described herein.

High path loss may present a challenge for certain wireless communication systems employing beams (e.g., 5G NR or mmW wireless systems). Accordingly, techniques including hybrid beamforming (analog and digital), which are not present in other wireless communication systems (e.g., 3G or 4G wireless systems), may be used in mmW systems. Hybrid beamforming creates narrow beam patterns to users (e.g., UEs), which may enhance link budget and/or a signal-to-noise ratio (SNR). The narrow beam patterns may be vulnerable to shadowing, which may be overcome via beam switching.

Quasi-co-location (QCL) assumptions generally refer to assumptions that, for a set of signals and/or beams and/or channels considered to be QCL related (or simply "QCL'd" for short), certain characteristics derived for (measured from) one of the signals and/or channels and/or beams may be applied to the other. As an example, if a CSI-RS transmission is QCL'd (e.g., QCL type A+D) with another DL RS, the doppler shift, doppler spread, average delay spread, average delay, or spatial reception parameters used for measuring the CSI-RS may be inferred from the parameters used for measuring the other DL RS.

Two antenna ports are said to be quasi co-located if properties of the channel over which a symbol on one antenna port is conveyed can be inferred from the channel over which a symbol on the other antenna port is conveyed. QCL supports beam management functionality including determining/estimating spatial parameters, frequency/timing offset estimation functionality including determining/estimating Doppler/delay parameters, and radio resource management (RRM) functionality including determining/estimating average gain. A network (e.g., BS) may indicate to a UE that the data and/or control channel may be transmitted in the direction/beam of a transmitted reference signal. The UE may measure the reference signal to determine characteristics of the data and/or control channel.

According to one example, the BS may configure a UE with four beams, each associated with a different direction and different beam identification. The BS may indicate to the UE a switch from a current active beam to one of the four configured beams. For instance, an indication to switch beams may be signaled via an active transmission configuration indicator (TCI) state change (e.g., a MAC-CE), TCI signaling per allocation (e.g., via DCI for PDSCH) (relevant in case where the UE supports more than one active TCI state), or a QCL configuration change per specific resource—CSI-RS (but not PDCCH). Following a beam switch command, both the UE and BS may switch to a particular beam. When a reference beam is QCL'd to data or control beams, the measurements the UE makes associated with a reference signal transmitted on a reference beam applies to the data or control channel, respectively. In this manner, the performance of the data or control channel may be measured using QCL'd reference beams.

The present disclosure provides implicit RLM/BFD resource configurations where RLM/BFD resources are determined based on CSI-RS resources used/configured in the active TCI states of PDCCH control resource sets (CORESETs) as further described herein. The implicit configuration may provide an ability to dynamically follow beam switching dynamics for RLM/BFD beams subset in terms of the corresponding RLM/BFD resources without an explicit RLM/BFD configuration, such as an RRC reconfiguration. The implicit configurations described herein may enable various performance improvements including improved RLM/BFD that dynamically track beam switches, reduced latency due to improved RLM/BFD, enhanced bandwidth due to improved RLM/BFD, and reduced signaling overhead.

Figure 7:
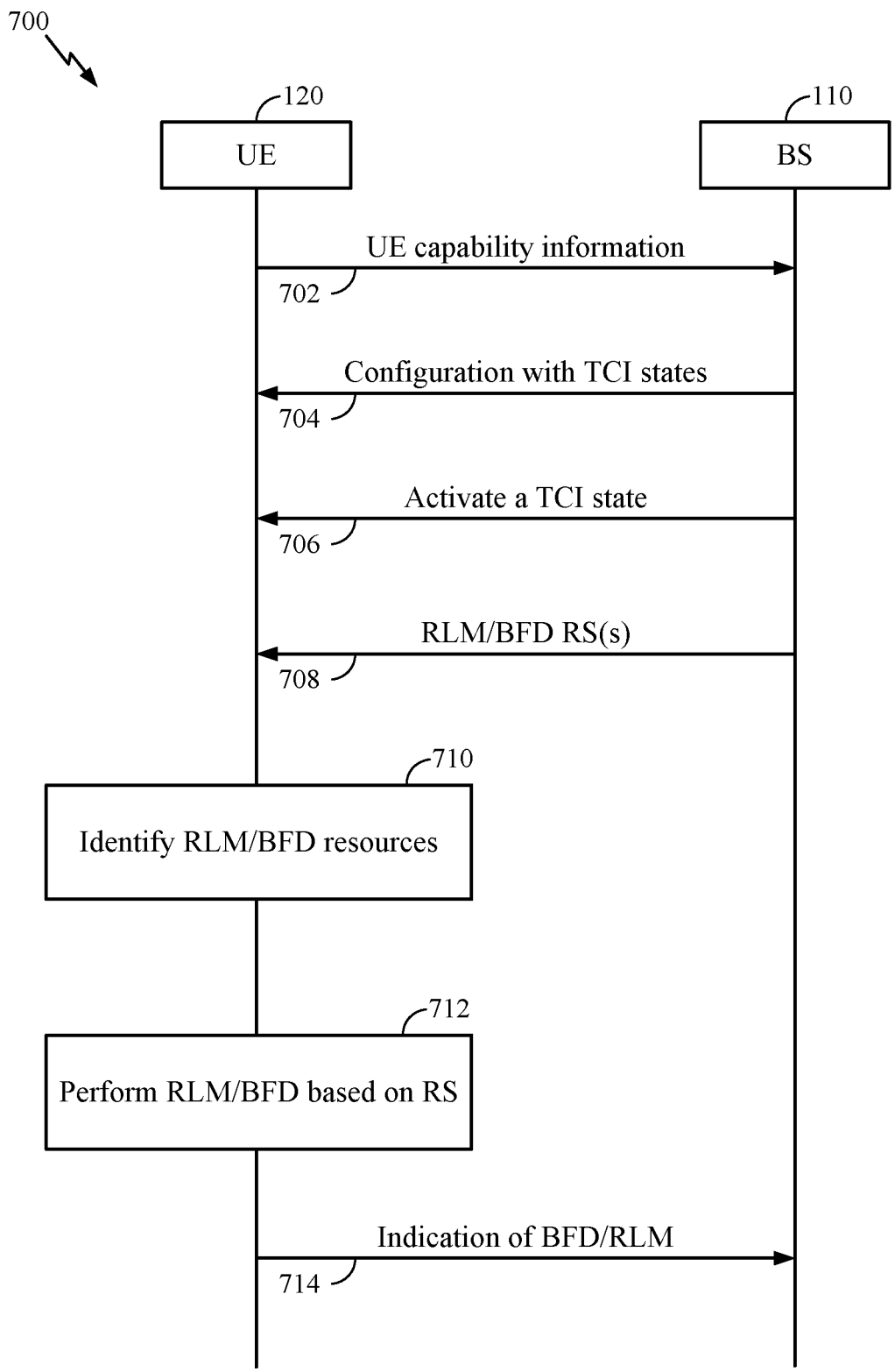
FIG. 7 is a call flow diagram illustrating example operations for performing RLM/BFD with implicitly configured RLM/BFD resources, in accordance with certain aspects of the present disclosure.

FIG. 7 is a call flow diagram illustrating example operations 700 for performing RLM/BFD with implicitly configured RLM/BFD resources, in accordance with certain aspects of the present disclosure. At 702, the UE 120 (e.g., the UE 120*a* shown in FIG. 1) may send, to the BS 110 (e.g., the BS 110*a* depicted in FIG. 1), capability information, which may indicate that the UE does not support performing RLM/BFD based on a CSI-RS or a combination of an SS block and CSI-RS. At 704, the BS 110 may transmit, to the UE 120, a configuration indicating TCI states for CORE-SETs on a PDCCH without any explicit RLM/BFD resource configuration. At 706, the BS 110 may transmit, to the UE 120, an indication to activate at least one of the TCI states including one or more CSI-RS resources having a QCL relationship with an SS block.

At 708, the UE 120 may receive, from the base station 110, RLM/BFD reference signal(s). In certain aspects, the RLM/BFD reference signals may be explicitly configured by the base station 110. In aspects, the RLM/BFD references signals may be implicitly configured by the base station 110. For example, the RLM/BFD references signals may correspond to one or more SS blocks associated with one of the active TCI states as further described herein.

At 710, the UE 120 may identify which resources to monitor for purposes of RLM/BFD according to various configurations, for example, either implicit or explicit configurations and/or various rules described herein. In aspects, if the UE does not support CSI-RS based RLM/BFD (e.g., per the UE capability information signaled at 702) and RLM/BFD RSs are not explicitly configured (e.g., the UE is configured without RLM/BFD RSs), the UE falls into scenarios of implicit configuration based on a RS associated with an activated TCI state on a PDCCH. For example, if the UE 120 does not support RLM/BFD based on a CSI-RS or a combination of an SS block and CSI-RS, the UE 120 may determine, at 710, that the CSI-RS resources in the active TCI states have a QCL relationship with an SS block and use the SS block for RLM/BFD measurements. As used herein, an active/activated TCI state may include a TCI state currently in use by a UE to communicate with a BS.

In certain aspects, if the RLM/BFD RS are explicitly or implicitly configured using aperiodic or semi-persistent resources, the UE 120 determines, at 710, to use a periodic QCL source associated with the aperiodic semi-persistent resources for RLM/BFD measurements. For example, if the active TCI states have aperiodic or semi-persistent resources, the UE 120 may determine that the CSI-RS resources, which may be aperiodic or semi-persistent, in the active TCI states have a QCL relationship with a periodic RS, such as an SS block, and the UE may use the SS block for RLM/BFD instead of the aperiodic/semi-persistent CSI-RS resources.

At 712, the UE 120 may perform RLM/BFD based on the RLM/BFD resources. For instance, the UE 120 may detect a beam failure based on various criteria associated with the RLM/BFD resources, for example, if the reference signal received power (RSRP) of the RLM/BFD RS (e.g., the identified SS block) is below a threshold for a certain period. In certain aspects, the UE 120 may take into account a gain parameter (e.g., a gain parameter reflecting the CSI-RS effective isotropic radiated power (EIRP) to SSB EIRP ratio) associated with one of the CSI-RS resources having a QCL relationship with the SS block. At 714, the UE 120 may send, to the BS, an indication of a beam failure or radio link failure, if a beam failure or radio link failure is detected.

FIG. 8 is a flow diagram illustrating example operations 800 that may be performed, for example, by a user equipment (e.g., the UE 120*a*), for performing RLM/BFD using implicitly configured RLM/BFD resources, in accordance with certain aspects of the present disclosure.

The operations 800 may begin, at 802, where the UE identifies that radio link monitoring (RLM) resources or beam failure detection (BFD) resources are configured implicitly by at least in part: obtaining transmission configuration indicator (TCI) states, for physical downlink control channel (PDCCH) control resource sets (CORESETs), obtaining an indication that at least one of the TCI states is activated to become an active TCI state of the PDCCH CORESETs, identifying one or more channel state information reference signal (CSI-RS) resources configured in the at least one of active TCI states of the PDCCH CORESETs, and if the UE does not support RLM or BFD based on the CSI-RS or the one or more CSI-RS resources are aperiodic or semi-persistent, determining a synchronization signal (SS) block for RLM or BFD that has a quasi-co-location (QCL) relationship with the one or more CSI-RS resources of the at least one of active TCI states. At 804, the UE performs RLM or BFD based on the SS block (taking into account a gain parameter as further described herein).

FIG. 9 is a flow diagram illustrating example operations 900 that may be performed, for example, by a base station (e.g., the BS 110*a*), for implicitly signaling RLM/BFD resources, in accordance with certain aspects of the present disclosure.

The operations 900 may begin, at 902, where the BS determines to implicitly configure radio link monitoring (RLM) resources or beam failure detection (BFD) resources. At 904, the BS configures a UE (e.g., the UE 120*a*) with TCI states for PDCCH CORESETs. At 906, the BS signals, to the UE, to activate at least one of the TCI states including one or more channel state information reference signal (CSI-RS) resources having a quasi-co-location (QCL) relationship with an synchronization signal (SS) block, to be used as an implicit configuration of the RLM resources or the BFD resources. At 908, the BS receives an indication of a radio link failure from the UE.

In certain aspects, the UE may be configured without RLM/BFD resources. For instance, during operations 800/900, the BS may not explicitly configure the UE with any RLM/BFD resources. At block 906, the BS may signal, to the UE configured without RLM/BFD resources, to activate at least one of the TCI states, such that the signaled TCI states indicate an implicit configuration of the RLM/BFD resources according to various implicit configurations further described herein. That is, at block 906, as the UE is not explicitly configured with RLM/BFD resources, the BS uses an implicit configuration of the RLM/BFD resources in which UE is expected to derive the RLM/BFD resources from the activated TCI states.

In accordance with certain aspects, the UE may not support RLM/BFD based on an CSI-RS. The UE may signal, to the BS, capability information indicating the UE does not support RLM/BFD based on the CSI-RS. The network (e.g., BS 110) may receive the capability information, but regardless of the capability information, signal to the UE, at block 906, active TCI states having CSI-RS resources without any explicit RLM/BFD resource configuration. According to an implicit RLM/BFD resource configuration, the UE may determine that the CSI-RS resources in the active TCI states have a QCL relationship with an SS block (e.g., at block 802) and use the SS block for RLM/BFD (e.g., at block 804). For instance, the UE may determine that the SS block is the QCL source for the CSI-RS resources of the active TCI states for the PDCCH CORESETs and use the QCL SS block for RLM/BFD.

In accordance with certain aspects, the UE may not support RLM/BSD based on a combination of an SS block and an CSI-RS. The UE may signal, to the BS, capability information indicating the UE does not support RLM/BFD based on the combination of an SS block and CSI-RS. The network (e.g., BS 110) may receive the capability information, but regardless of the capability information, signal to the UE, at block 906, active TCI states having a combination of SS blocks and CSI-RS resources without any explicit RLM/BFD resource configuration. According to an implicit RLM/BFD resource configuration, the UE may determine that the CSI-RS resources in the active TCI states have a QCL relationship with an SS block (e.g., at block 802) and use the SS block for RLM/BFD (e.g., at block 804). For example, the UE may determine that the SS block is the QCL source for the CSI-RS resources of the active TCI states for the PDCCH CORESETs and use the QCL SS block for RLM/BFD.

In accordance with certain aspects, a valid resource for RLM/BFD measurements may be considered a periodic reference signal. The network may signal to the UE active TCI states having aperiodic or semi-persistent resources without any explicit RLM/BFD resource configuration. For instance, the CSI-RS resource used in active TCI states of the CORESETs corresponding to the QCL SS block may be aperiodic (AP) or semi-persistent (SP). In case of an implicit RLM/BFD resource configuration, the UE may determine that the CSI-RS resources, which may be aperiodic or semi-persistent, in the active TCI states have a QCL relationship with a periodic RS such as an SS block directly or indirectly (e.g., at block 802), and the UE may use the periodic SS block for RLM/BFD (e.g., at block 804) instead of AP/SP CSI-RS resources. As an example, the UE may determine that the SS block is the QCL source for the CSI-RS resources of the active TCI states for the PDCCH CORESETs and use the QCL SS block for RLM/BFD.

In other aspects, the UE may be configured with RLM/BFD resource, but in some cases, the UE may use periodic resources associated with a TCI state as the RLM/BFD resources. For instance, if the TCI states have AP/SP resources, the UE may determine that the CSI-RS resources, which may be AP or SP, in the active TCI states have a QCL relationship with a periodic RS such as an SS block directly or indirectly (e.g., at block 802), and the UE may use the SS block for RLM/BFD (e.g., at block 804) instead of the AP/SP CSI-RS resources.

In certain aspects, the QCL relationship between the SS block and the CSI-RS resources may be based on at least one of a Doppler shift, a Doppler spread, an average delay, or delay spread. In certain cases, the UE may be configured with an active TCI state for PDCCH reception with more than one RS/QCL objects. In such a case, there are more than one RSs in the active TCI state, for implicit RLM/BFD configuration scenario, the relevant RLM/BFD resource is identified from RS, having a QCL relationship based on spatial reception parameters (e.g., QCL Type D), configured in the active TCI state(s) for PDCCH. In case that this resource is CSI-RS and the UE does not support RLM or BFD based on CSI-RS or the CSI-RS is AP/SP, the UE may use the SS block with the QCL relationship to the corresponding CSI-RS resource for RLM/BFD measurements as described herein.

In certain aspects, the UE may be configured with an active TCI state for PDCCH reception including only one RS. In such a case, the UE may determine to use the SS block, for RLM/BFD, with a QCL relationship based on at least one of a Doppler shift, a Doppler spread, an average delay, delay spread, or reception parameters.

In certain aspects, performing the RLM/BFD at block 804 may include performing the RLM or BFD based on a transmission power gain parameter associated with a CSI-RS resource compared/referencing to the QCL'd SS block. In aspects, the transmission power gain parameter may indicate a boosting configuration for corresponding CSI-RS resources. For an RLM/BFD measurement based on the corresponding SS block as described herein, which is the QCL source of the CSI-RS resource configured in the active TCI state of the PDCCH, the UE may take into account the configured power control offset parameter (e.g., a gain parameter reflecting the CSI-RS EIRP to SSB EIRP ratio) of the corresponding CSI-RS resource in order to factor the corresponding SSB based SNR estimations, prior to using them to derive out-of-sync/in-sync indication for RLM/BFD. Taking into account the power control offset parameter may allow the RLM/BFD indication to reflect the EIRP of a CSI-RS beam that should be addressed for RLM/BFD in case of implicitly configured RLM/BFD resource in case that RLM/BFD measurement is based on the QCL'd source SS block (beam) as described herein. In certain aspects, if the gain parameter for the corresponding CSI-RS resource is not configured by control signaling from a base station, the UE may assume the gain parameter is a default value (e.g., 0 dB).

Figure 10:
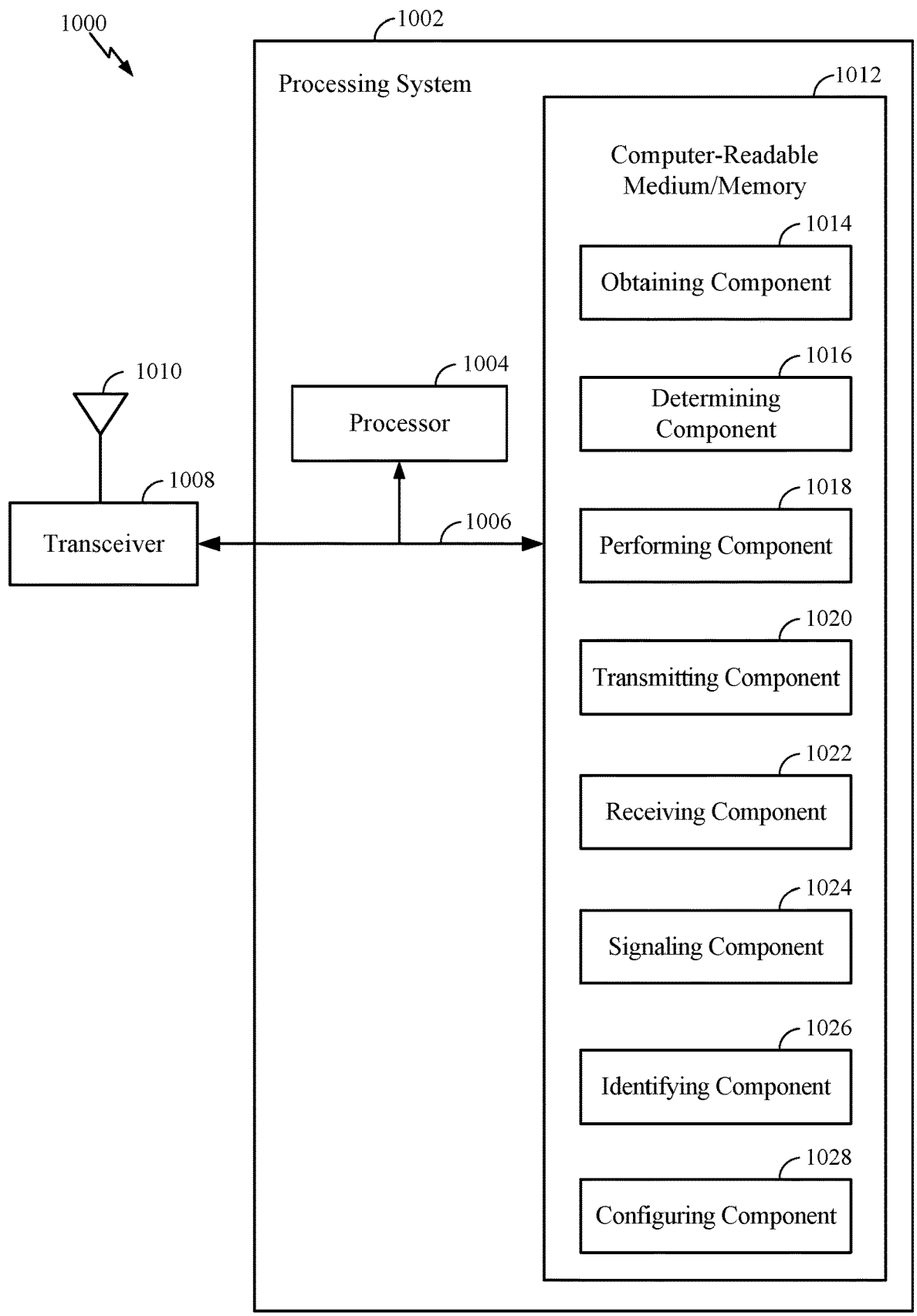
FIG. 10 illustrates a communications device that may include various components configured to perform operations for the techniques disclosed herein in accordance with aspects of the present disclosure.

FIG. 10 illustrates a communications device 1000 (e.g., the UE 120*a*) that may include various components (e.g., corresponding to means-plus-function components) configured to perform operations for the techniques disclosed herein, such as the operations illustrated in FIG. 8. The communications device 1000 includes a processing system 1002 coupled to a transceiver 1008. The transceiver 1008 is configured to transmit and receive signals for the communications device 1000 via an antenna 1010, such as the various signal described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions that when executed by processor 1004, cause the processor 1004 to perform the operations illustrated in FIG. 8, or other operations for performing the various techniques discussed herein.

In certain aspects, the processing system 1002 may further include an obtaining component 1014 for performing the operations illustrated in FIG. 8, or other aspects of the operations described herein. Additionally, the processing system 1002 may include a determining component 1016 for performing the operations illustrated in FIG. 8, or other aspects of the operations described herein. Additionally, the processing system 1002 may include a performing component 1018 for performing the operations illustrated in FIG. 8, or other aspects of the operations described herein. Additionally, the processing system 1002 may include a transmitting component 1020 for performing the operations illustrated in FIG. 8, or other aspects of the operations described herein. Additionally, the processing system 1002 may include a receiving component 1022 for performing the operations illustrated in FIG. 8, or other aspects of the operations described herein. Additionally, the processing system 1002 may include a signaling component 1024 for performing the operations illustrated in FIG. 8, or other aspects of the operations described herein. Additionally, the processing system 1002 may include an identifying component 1026 for performing the operations illustrated in FIG. 8, or other aspects of the operations described herein. Additionally, the processing system 1002 may include a configuring component 1028 for performing the operations illustrated in FIG. 8, or other aspects of the operations described herein.

The obtaining component 1014, determining component 1016, performing component 1018, transmitting component 1020, receiving component 1022, signaling component 1024, identifying component 1026, and/or configuring component 1028 may be coupled to the processor 1004 via bus 1006. In certain aspects, the obtaining component 1014, determining component 1016, performing component 1018, transmitting component 1020, receiving component 1022, signaling component 1024, identifying component 1026, and/or configuring component 1028 may be hardware circuits. In certain aspects, the obtaining component 1014, determining component 1016, performing component 1018, transmitting component 1020, receiving component 1022, signaling component 1024, identifying component 1026, and/or configuring component 1028 may be software components that are executed and run on processor 1004.

Figure 11:
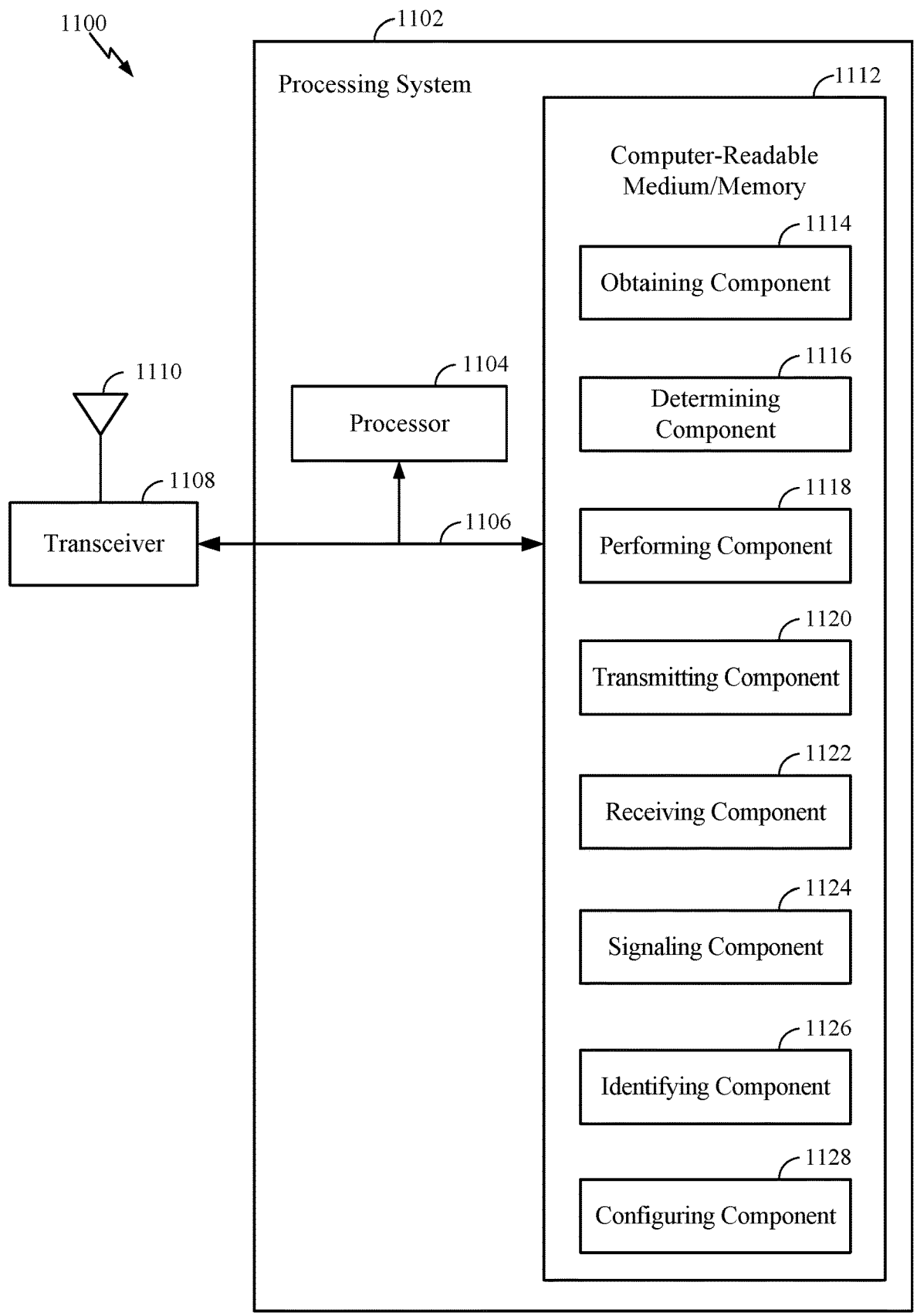
FIG. 11 illustrates a communications device that may include various components configured to perform operations for the techniques disclosed herein in accordance with aspects of the present disclosure.

FIG. 11 illustrates a communications device 1100 (e.g., the BS 110a) that may include various components (e.g., corresponding to means-plus-function components) configured to perform operations for the techniques disclosed herein, such as the operations illustrated in FIG. 9. The communications device 1100 includes a processing system 1102 coupled to a transceiver 1108. The transceiver 1108 is configured to transmit and receive signals for the communications device 1100 via an antenna 1110, such as the various signal described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/ memory 1112 is configured to store instructions that when executed by processor 1104, cause the processor 1104 to perform the operations illustrated in FIG. 9, or other operations for performing the various techniques discussed herein.

In certain aspects, the processing system 1102 may further include an obtaining component 1114 for performing the operations illustrated in FIG. 9, or other aspects of the operations described herein. Additionally, the processing system 1102 may include a determining component 1116 for performing the operations illustrated in FIG. 9, or other aspects of the operations described herein. Additionally, the processing system 1102 may include a performing component 1118 for performing the operations illustrated in FIG. 9, or other aspects of the operations described herein. Additionally, the processing system 1102 may include a transmitting component 1120 for performing the operations illustrated in FIG. 9, or other aspects of the operations described herein. Additionally, the processing system 1102 may include a receiving component 1122 for performing the operations illustrated in FIG. 9, or other aspects of the operations described herein. Additionally, the processing system 1102 may include a signaling component 1124 for performing the operations illustrated in FIG. 9, or other aspects of the operations described herein. Additionally, the processing system 1102 may include an identifying component 1126 for performing the operations illustrated in FIG. 9, or other aspects of the operations described herein. Additionally, the processing system 1102 may include a configuring component 1128 for performing the operations illustrated in FIG. 9, or other aspects of the operations described herein.

The obtaining component 1114, determining component 1116, performing component 1118, transmitting component 1120, receiving component 1122, signaling component 1124, identifying component 1126, and/or configuring component 1128 may be coupled to the processor 1104 via bus 1106. In certain aspects, the obtaining component 1114, determining component 1116, performing component 1118, transmitting component 1120, receiving component 1122, signaling component 1124, identifying component 1126, and/or configuring component 1128 may be hardware circuits. In certain aspects, the obtaining component 1114, determining component 1116, performing component 1118, transmitting component 1120, receiving component 1122, signaling component 1124, identifying component 1126, and/or configuring component 1128 may be software components that are executed and run on processor 1104.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

In addition to the embodiments described above, many examples of specific combinations are within the scope of the disclosure, some of which are detailed below:

Example 1

A method of wireless communication by a user equipment (UE), comprising: identifying that radio link monitoring (RLM) resources or beam failure detection (BFD) resources are configured implicitly by at least in part: obtaining transmission configuration indicator (TCI) states, for physical downlink control channel (PDCCH) control resource sets (CORESETs), obtaining an indication that at least one of the TCI states is activated to become an active TCI state of the PDCCH CORESETs, identifying one or more channel state information reference signal (CSI-RS) resources configured in the at least one of active TCI states of the PDCCH CORESETs, and if the UE does not support RLM or BFD based on the CSI-RS or the one or more CSI-RS resources are aperiodic or semi-persistent, determining a synchronization signal (SS) block for RLM or BFD that has a quasi-co-location (QCL) relationship with the one or more CSI-RS resources of the at least one of active TCI states; and performing RLM or BFD based on the SS block.

Example 2

The method of example 1, wherein the SS block is a QCL source for the one or more CSI-RS resources of the at least one active TCI states of the PDCCH CORESETs, and the QCL relationship between the SS block and the one or more CSI-RS resources is based on spatial reception parameters or at least one of a Doppler shift, a Doppler spread, an average delay, or delay spread.

Example 3

The method of example 1, wherein the UE does not support RLM or BFD based on a combination of the SS block and the CSI-RS according to UE capability information signaled to a base station.

Example 4

The method of example 1, wherein performing RLM or BFD comprises performing the RLM or BFD taking into account a gain parameter associated with the one or more CSI-RS resources having a QCL relationship with the SS block.

Example 5

The method of example 4, wherein the gain parameter is assumed to be a default value equal to 0 dB, if the gain parameter is not configured by control signaling from a base station.

Example 6

A method of wireless communication by a base station (BS), comprising: determining to implicitly configure radio link monitoring (RLM) resources or beam failure detection (BFD) resources; configuring a user equipment (UE) with transmission configuration indicator (TCI) states for physical downlink control channel (PDCCH) control resource sets (CORESETs); signaling, to the UE, to activate at least one of the TCI states including one or more channel state information reference signal (CSI-RS) resources having a quasi-co-location (QCL) relationship with a synchronization signal (SS) block, to be used as an implicit configuration of the RLM resources or the BFD resources; and receiving an indication of a radio link failure from the UE.

Example 7

The method of example 6, wherein the SS block is a QCL source for the one or more CSI-RS resources of the active TCI states of the PDCCH CORESETs, and the QCL relationship between the SS block and the one or more CSI-RS resources is based on spatial reception parameters or at least one of a Doppler shift, a Doppler spread, an average delay, or delay spread.

Example 8

The method of example 6, wherein the UE does not support RLM or BFD based on the CSI-RS according to UE capability information signaled to the BS.

Example 9

The method of example 6, wherein the UE does not support radio link monitoring based on a combination of an SS block and the CSI-RS according to UE capability information signaled to the BS:

Example 10

The method of example 6, wherein the one or more CSI-RS resources used in the at least one of the active TCI states of the PDCCH CORESETs are at least one of aperiodic or semi-persistent resources.

Example 11

The method of example 6, further comprising signaling, to the UE, a gain parameter associated with one of the one or more CSI-RS resources used for the at least one of the active TCI states of the PDCCH CORESETs, and wherein the indication of radio link failure is determined taking into account the gain parameter configured for the corresponding CSI-RS resource.

Example 12

An apparatus for wireless communication, comprising: a receiver configured to: receive transmission configuration indicator (TCI) states, for physical downlink control channel (PDCCH) control resource sets (CORESETs), and receive an indication that at least one of the TCI states is activated to become an active TCI state of the PDCCH CORESETs; and a processing system configured to: identify that radio link monitoring (RLM) resources or beam failure detection (BFD) resources are configured implicitly by at least in part: identifying one or more channel state information reference signal (CSI-RS) resources configured in the at least one of active TCI states of the PDCCH CORESETs, and if the apparatus does not support RLM or BFD based on the CSI-RS or the one or more CSI-RS resources are aperiodic or semi-persistent, determining a synchronization signal (SS) block for RLM or BFD that has a quasi-co-location (QCL) relationship with the one or more CSI-RS resources of the at least one of active TCI states, and perform RLM or BFD based on the SS block.

Example 13

The apparatus of example 12, wherein the SS block is a QCL source for the one or more CSI-RS resources of the at least one active TCI states of the PDCCH CORESETs, and the QCL relationship between the SS block and the one or more CSI-RS resources is based on spatial reception parameters or at least one of a Doppler shift, a Doppler spread, an average delay, or delay spread.

Example 14

The apparatus of example 12, further comprising: a transmitter configured to transmit, to a base station, capability information indicating the apparatus does not support RLM or BFD based on a combination of the SS block and the CSI-RS.

Example 15

The apparatus of example 12, wherein the processing system is further configured to perform the RLM or BFD taking into account a gain parameter associated with the one or more CSI-RS resources having a QCL relationship with the SS block.

Example 16

The apparatus of example 15, wherein the gain parameter is assumed to be a default value equal to 0 dB, if the gain parameter is not configured by control signaling from a base station.

Example 17

An apparatus for wireless communication, comprising: a processing system configured to determine to implicitly configure radio link monitoring (RLM) resources or beam failure detection (BFD) resources; a transmitter configured to: transmit, to a user equipment (UE), transmission configuration indicator (TCI) states for physical downlink control channel (PDCCH) control resource sets (CORESETs), and transmit, to the UE, to activate at least one of the TCI states including one or more channel state information reference signal (CSI-RS) resources having a quasi-co-location (QCL) relationship with an synchronization signal (SS) block, to be used as an implicit configuration of the RLM resources or the BFD resources; and a receiver configured to receive an indication of a radio link failure from the UE.

Example 18

The apparatus of example 17, wherein the SS block is a QCL source for the one or more CSI-RS resources of the active TCI states of the PDCCH CORESETs, and the QCL relationship between the SS block and the one or more CSI-RS resources is based on spatial reception parameters or at least one of a Doppler shift, a Doppler spread, an average delay, or delay spread.

Example 19

The apparatus of example 17, wherein the receiver is further configured to receive, from the UE, capability information indicating the UE does not support RLM or BFD based on the CSI-RS.

Example 20

The apparatus of example 17, wherein the receiver is further configured to receive, from the UE, capability information indicating the UE does not support RLM or BFD based on a combination of an SS block and the CSI-RS.

Example 21

The apparatus of example 17, wherein the one or more CSI-RS resources used in the at least one of the active TCI states of the PDCCH CORESETs are at least one of aperiodic or semi-persistent resources.

Example 22

The apparatus of example 17, wherein the transmitter is configured to signal, to the UE, a gain parameter associated with one of the one or more CSI-RS resources used for the at least one of the active TCI states of the PDCCH CORESETs.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 8 and 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment (UE), comprising:
    identifying that radio link monitoring (RLM) resources or beam failure detection (BFD) resources are configured implicitly by at least in part:
        obtaining transmission configuration indicator (TCI) states, for physical downlink control channel (PDCCH) control resource sets (CORESETs),
        obtaining an indication that at least one of the TCI states is activated to become an active TCI state of the PDCCH CORESETs,
        identifying one or more channel state information reference signal (CSI-RS) resources configured in the at least one of active TCI states of the PDCCH CORESETs, and
        if the UE does not support RLM or BFD based on the CSI-RS or the one or more CSI-RS resources are aperiodic or semi-persistent, determining a synchronization signal (SS) block for RLM or BFD that has a quasi-co-location (QCL) relationship with the one or more CSI-RS resources of the at least one of active TCI states; and
    performing RLM or BFD based on the SS block, wherein performing RLM or BFD comprises performing the RLM or BFD taking into account a gain parameter associated with the one or more CSI-RS resources having a QCL relationship with the SS block.

2. The method of claim 1, wherein the SS block is a QCL source for the one or more CSI-RS resources of the at least one active TCI states of the PDCCH CORESETs, and the QCL relationship between the SS block and the one or more CSI-RS resources is based on spatial reception parameters or at least one of a Doppler shift, a Doppler spread, an average delay, or delay spread.

3. The method of claim 1, wherein the UE does not support RLM or BFD based on a combination of the SS block and the CSI-RS according to UE capability information signaled to a base station.

4. The method of claim 1, wherein the gain parameter is assumed to be a default value equal to 0 dB, if the gain parameter is not configured by control signaling from a base station.

5. The method of claim 1, wherein the UE does not support RLM or BFD based on the CSI-RS according to a UE capability.

6. A method of wireless communication by a base station (BS), comprising:
   determining to implicitly configure radio link monitoring (RLM) resources or beam failure detection (BFD) resources;
   configuring a user equipment (UE) with transmission configuration indicator (TCI) states for physical downlink control channel (PDCCH) control resource sets (CORESETs);
   signaling, to the UE, to activate at least one of the TCI states including one or more channel state information reference signal (CSI-RS) resources having a quasi-co-location (QCL) relationship with a synchronization signal (SS) block, to be used as an implicit configuration of the RLM resources or the BFD resources;
   signaling, to the UE, a gain parameter associated with one of the one or more CSI-RS resources used for the at least one of the active TCI states of the PDCCH CORESETs, wherein the indication of radio link failure is determined taking into account the gain parameter configured for the corresponding CSI-RS resource; and
   receiving an indication of a radio link failure from the UE.

7. The method of claim 6, wherein the SS block is a QCL source for the one or more CSI-RS resources of the active TCI states of the PDCCH CORESETs, and the QCL relationship between the SS block and the one or more CSI-RS resources is based on spatial reception parameters or at least one of a Doppler shift, a Doppler spread, an average delay, or delay spread.

8. The method of claim 6, wherein the UE does not support RLM or BFD based on the CSI-RS according to UE capability information signaled to the BS.

9. The method of claim 6, wherein the UE does not support radio link monitoring based on a combination of an SS block and the CSI-RS according to UE capability information signaled to the BS.

10. The method of claim 6, wherein the one or more CSI-RS resources used in the at least one of the active TCI states of the PDCCH CORESETs are at least one of aperiodic or semi-persistent resources.

11. An apparatus for wireless communication, comprising:
   a receiver configured to:
      receive transmission configuration indicator (TCI) states, for physical downlink control channel (PDCCH) control resource sets (CORESETs), and
      receive an indication that at least one of the TCI states is activated to become an active TCI state of the PDCCH CORESETs; and
   a processing system configured to:
      identify that radio link monitoring (RLM) resources or beam failure detection (BFD) resources are configured implicitly by at least in part:
         identifying one or more channel state information reference signal (CSI-RS) resources configured in the at least one of active TCI states of the PDCCH CORESETs, and
         if the apparatus does not support RLM or BFD based on the CSI-RS or the one or more CSI-RS resources are aperiodic or semi-persistent, determining a synchronization signal (SS) block for RLM or BFD that has a quasi-co-location (QCL) relationship with the one or more CSI-RS resources of the at least one of active TCI states, and
      perform RLM or BFD based on the SS block, wherein the processing system is further configured to perform the RLM or BFD taking into account a gain parameter associated with the one or more CSI-RS resources having a QCL relationship with the SS block.

12. The apparatus of claim 11, wherein the SS block is a QCL source for the one or more CSI-RS resources of the at least one active TCI states of the PDCCH CORESETs, and the QCL relationship between the SS block and the one or more CSI-RS resources is based on spatial reception parameters or at least one of a Doppler shift, a Doppler spread, an average delay, or delay spread.

13. The apparatus of claim 11, further comprising:
   a transmitter configured to transmit, to a base station, capability information indicating the apparatus does not support RLM or BFD based on a combination of the SS block and the CSI-RS.

14. The apparatus of claim 11, wherein the gain parameter is assumed to be a default value equal to 0 dB, if the gain parameter is not configured by control signaling from a base station.

15. The apparatus of claim 11, wherein the apparatus does not support RLM or BFD based on the CSI-RS according to a UE capability.

16. An apparatus for wireless communication, comprising:
   a processing system configured to determine to implicitly configure radio link monitoring (RLM) resources or beam failure detection (BFD) resources;
   a transmitter configured to:
      transmit, to a user equipment (UE), transmission configuration indicator (TCI) states for physical downlink control channel (PDCCH) control resource sets (CORESETs),
      transmit, to the UE, to activate at least one of the TCI states including one or more channel state information reference signal (CSI-RS) resources having a quasi-co-location (QCL) relationship with a synchronization signal (SS) block, to be used as an implicit configuration of the RLM resources or the BFD resources, and
      signal, to the UE, a gain parameter associated with one of the one or more CSI-RS resources used for the at least one of the active TCI states of the PDCCH CORESETs; and
   a receiver configured to receive an indication of a radio link failure from the UE.

17. The apparatus of claim 16, wherein the SS block is a QCL source for the one or more CSI-RS resources of the active TCI states of the PDCCH CORESETs, and the QCL relationship between the SS block and the one or more CSI-RS resources is based on spatial reception parameters or at least one of a Doppler shift, a Doppler spread, an average delay, or delay spread.

18. The apparatus of claim 16, wherein the receiver is further configured to receive, from the UE, capability information indicating the UE does not support RLM or BFD based on the CSI-RS.

19. The apparatus of claim 16, wherein the receiver is further configured to receive, from the UE, capability information indicating the UE does not support RLM or BFD based on a combination of an SS block and the CSI-RS.

20. The apparatus of claim 16, wherein the one or more CSI-RS resources used in the at least one of the active TCI states of the PDCCH CORESETs are at least one of aperiodic or semi-persistent resources.

\* \* \* \* \*